(12) United States Patent
Albanese et al.

(10) Patent No.: US 7,895,445 B1
(45) Date of Patent: Feb. 22, 2011

(54) TOKEN-BASED REMOTE DATA ACCESS

(75) Inventors: Michael J. Albanese, San Jose, CA (US); James Roland Henderson, Morgan Hill, CA (US); Keith Barraclough, Mountain View, CA (US); David Irvine, San Jose, CA (US); Rodrigo Philander, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 962 days.

(21) Appl. No.: 11/374,414

(22) Filed: Mar. 13, 2006

Related U.S. Application Data

(63) Continuation-in-part of application No. 09/843,249, filed on Apr. 26, 2001, now Pat. No. 7,139,834, and a continuation-in-part of application No. 11/056,345, filed on Feb. 11, 2005.

(51) Int. Cl.
*H04L 9/32* (2006.01)
*G06F 21/00* (2006.01)
*H04N 7/16* (2006.01)
*H04L 29/06* (2006.01)
*G06F 7/04* (2006.01)

(52) U.S. Cl. ................ 713/185; 713/172; 713/178; 713/182; 725/29; 726/9; 726/20

(58) Field of Classification Search ............ 713/172, 713/178, 182, 185; 726/27, 9, 20; 725/29
See application file for complete search history.

(56) References Cited

U.S. PATENT DOCUMENTS

| | | | |
|---|---|---|---|
| 4,979,118 A | 12/1990 | Kheradpir | |
| 5,774,660 A | 6/1998 | Brendel et al. | |
| 5,862,325 A | 1/1999 | Reed et al. | |
| 5,920,701 A | 7/1999 | Miller et al. | |
| 6,006,264 A | 12/1999 | Colby et al. | |
| 6,067,565 A | 5/2000 | Horvitz | |
| 6,112,225 A | 8/2000 | Kraft et al. | |
| 6,161,133 A | 12/2000 | Kikinis | |
| 6,167,438 A | 12/2000 | Yates et al. | |
| 6,490,625 B1 | 12/2002 | Islam et al. | |
| 6,577,601 B1 | 6/2003 | Wolpert | |

(Continued)

FOREIGN PATENT DOCUMENTS

EP    1 376 398 A2    1/2004

OTHER PUBLICATIONS

Supplementary European Search Report, PCT/US2007068985, Dec. 15, 2009, pp. 1-9.

*Primary Examiner*—Eleni A Shiferaw
*Assistant Examiner*—Mohammad W Reza
(74) *Attorney, Agent, or Firm*—Ditthavong Mori & Steiner, P.C.

(57) ABSTRACT

Data transfer between remote and home locations over a network is effected using an electronic token to facilitate access to the data. According to an example embodiment of the present invention, a network-based server facilitates the generation of a token specifying conditions upon which data access to a registered user's data can be made. When a request for data transfer is received in connection with a token, information in the token is used together with the request to selectively authenticate and serve the request.

16 Claims, 4 Drawing Sheets

U.S. PATENT DOCUMENTS

| | | |
|---|---|---|
| 6,751,664 B1 | 6/2004 | Kogan et al. |
| 2002/0052798 A1 | 5/2002 | Nishikado et al. |
| 2002/0174246 A1 | 11/2002 | Tanay et al. |
| 2004/0003132 A1 | 1/2004 | Stanley et al. |
| 2004/0243839 A1 | 12/2004 | Bhatia et al. |

TOKEN-BASED REMOTE DATA ACCESS

RELATED PATENT DOCUMENTS

This application is a continuation-in-part of U.S. patent application Ser. No. 09/843,249 entitled "Data Routing Monitoring and Management," filed Apr. 26, 2001, now U.S. Pat. No. 7,139,834 and of U.S. patent application Ser. No. 11/056,345 entitled "Network-distributed Data Routing," filed Feb. 11, 2005, to both of which priority is claimed under 35 U.S.C. §120 for common subject matter.

FIELD OF THE INVENTION

The present invention relates generally to communications and, more particularly, to the access of local data from a remote network device via a network such as the internet, with the access controlled via user-designated access data such as an electronic token.

BACKGROUND OF THE INVENTION

Data communications over a variety of networks, such as Internet protocol (IP) networks, mobile telephone networks and others have increased at an astonishing rate over recent years. The affordability and availability of computers, telephones, wireless devices and other network access appliances has made their use prevalent in a variety of applications. Further, as the demand for network access devices has increased, the diversity in types of network access appliances has also increased, with different devices often implementing different protocols and performance-based operational characteristics.

As access to the Internet and other communications networks becomes easier, convenient and more readily available, these networks are increasingly used for transferring data such as images, audio, email, video and text. In many applications, such data is desirably transferred or shared from a user's computer (or other network access appliance) on a selective basis. For example, data for computer software, music, video, news services, games and other applications is often desirably shared and/or accessed remotely via the Internet and, for many applications, via wireless networks such as those implemented for cellular telephones. Today, the number of network subscribers, data providers, and requests by those subscribers for data transfer, streaming data and other content are growing exponentially. In many such applications, access to data or other content by users owning or subscribing to the data is desirably flexible and controllable by such users. However, the limitations of current systems restrict the ability to meet demands for flexible, controllable access to data or other content in a reliable, secure, efficient and affordable manner.

Content (e.g., audio, images or video) has evolved in application and is readily stored electronically. For example, the storage of music in rewritable electronic media has become a popular method in which to maintain and access music collections. Another example involves video applications, where digital recording and storage of television and personal video collections has become popular, as has the streaming (via the Internet) of audio and video. Photos are often stored and accessed electronically, instead of relying upon conventional printed photos and physical photo albums.

As the electronic storage of content and other data grows in popularity, access to the data as well as convenient manners in which to store the data and become increasingly important. For example, sales of music in downloadable audio formats are becoming increasingly popular. Digital audio players based in the home or office or mobile players that can be used in autos, laptop computers, personal listening devices and others are used for playback of this downloaded music. In order to play the music, audio data is loaded onto mobile players or local computers and used to locally play the music. Typically, the amount of storage space required for storing a large volume of audio data exceeds the memory capacity of digital audio players, computers or other appliances capable of playing music. In this regard, the management and use of audio, as well as other data such as image data and video data, has become increasingly burdensome in view of the demand for and use of this data.

As applied to conventional documents and other types of data (e.g., text-based documents, spreadsheets or presentations), the demand for flexible and efficient access to such data has also grown. For example, many workplaces have become increasingly mobile; employees are often working from a remote location such as at home or at traveling locations. Access to data from remote locations has been particularly useful for facilitating mobility while maintaining a desirable level of access to information. However, the growing size of data files desirably transferred to facilitate mobility or to otherwise provide flexible data access has presented challenges to the delivery of such data over communications channels. For instance, email is generally limited in its ability to transfer large data files, such as audio, video, text and presentation files.

For many communication applications, the increase in use and lack of availability of data transfer approaches requires the creative use of communications channels and data. To meet these and other data transfer needs, networks have been enhanced both in the ability to process larger quantities of data and in the ability to process data at a higher rate of speed. In addition, network access appliances have been improved to increase the speed at which data can be processed and transferred. However, as the demand for high quantity data transfer increases, these needs become more difficult to meet.

One challenge to data transfer on the Internet stems from the inflexibility of data transfer channels. For example, if a data supplier sells data to an end user via the Internet, the end user typically downloads the data using one of only a handful of download locations operated at the control of the supplier. This type of operation can be cumbersome and expensive because the data may have to travel a significant distance and thus take up more time and space in the communications network. In addition, the transfer of data is limited by the location of the download locations.

Another challenge to the effective transfer and management of data is related to the provision of data at an acceptable transfer rate (e.g., as related to bandwidth). Certain network access appliances are limited in their ability to process audio data at different speeds, either by their internal configurations or by the availability of network access. For instance, mobile (wireless) type network access appliances can be limited by the available connectivity to mobile networks. In addition, certain network appliances may be adaptable for wired and wireless communications, with their respective ability to access data being relatively higher (e.g., faster) via wired communications, relative to wireless; when these appliances are operating via wireless communications, they may be able to receive data at a lower speed, or bitrate.

Yet another challenge to data transfer and management stems from the existence of a myriad of different types of data, as well as different types of data access appliances. For example, a variety of different data types are implemented for storing audio files. Often, these data types are associated with a particular type of digital audio device that is being used for playback. In addition, with each data type, there are often different manners in which the data is stored, typically involving different levels of quality (e.g., with different playback bitrates). In this regard, a digital audio player must not only have access to data but also have access to data in a particular format.

Still another challenge to network data transfer involves the management of media rights associated with digital rights management (DRM). As discussed above, digital media such as audio or video can be purchased via electronic delivery. In order to inhibit and/or prevent copying, distribution or other unauthorized use of data, security precautions are taken. In some applications, these security precautions require specific approaches to enable playback, which can further exacerbate difficulties associated with data transfer and subsequent use (e.g., playback).

Effectively and efficiently managing shared data transfer via communication networks has been challenging in the face of the advancement of technologies and trade channels that use or could use network-based data transfer.

SUMMARY OF THE INVENTION

The present invention is directed to approaches to data routing, management and associated applications for making content available at a remote device. The present invention is exemplified in a number of implementations and applications, some of which are summarized below.

According to an example embodiment of the present invention, an approach to data routing involves the creation of a token that includes information for granting remote access to selected data at a home, business or local network node.

According to another example embodiment of the present invention, registered users provide content, via a packet-communicating device, for transfer over the Internet to a remote packet-communicating device. A server-hosted approach facilitates such remote-user access to registered-user content. Resource selections and content-sharing characteristics are received from a registered user via a web-based user interface made available by the hosting server. In response to the resource selections, a share that designates content-sharing characteristics is created by generating an electronic key (e.g., data) that specifies resources that are the subject of the received resource selections available via the registered user's packet-communicating device. A unique identifier of an agent via which access to the specified resources can be made is associated with the electronic key. A unique authentication is generated for and assigned to the key. An electronic token bearing the key, the unique identifier and the unique authentication is then created and provided, as a function of the share characteristics, for use by a remote user at a packet-communicating device. In response to the remote user implementing the token with a content request via an agent, the token is authenticated as a function of the unique authentication. When a token is authenticated, access to the requested content via the registered user's packet-communicating device is facilitated (via the remote device) as a function of the resources specified by the key in the token.

In another example embodiment of the present invention, a network communication system communicates data from a registered user's base location to a remote network appliance (e.g., a packet-communicating device) via the Internet in response to an electronic token. The system includes a base network computer arrangement that accesses stored data and communicates the accessed stored data via the Internet. A remote network appliance receives data routed via the Internet, such as that routed from the base network computer arrangement. A network-distributed routing controller is implemented in the base network computer arrangement and in a server (e.g., via software implemented at each), and facilitates the routing of data. The server receives and responds to electronic token-bearing requests for communicating data from the base network computer arrangement to the remote network appliance by verifying each request as a function of security data provided via the electronic token in the request. Once a request is verified, the server implements the network-distributed routing controller to administratively control the base network computer arrangement to access the requested data and to route the accessed requested data from the base network computer arrangement to the remote network appliance via the Internet.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
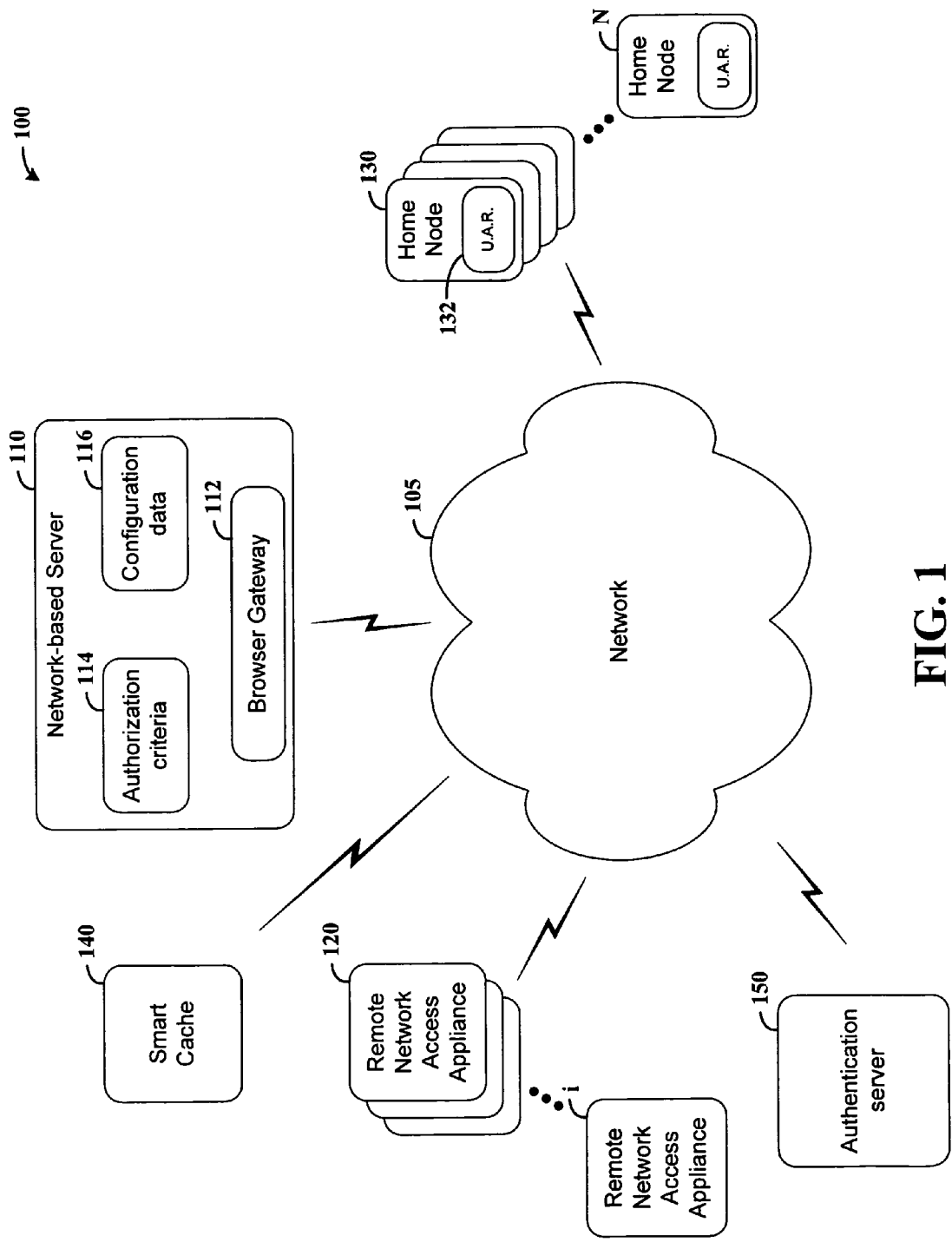
FIG. 1 is a system for routing data via an internet protocol network using a server-hosted interface access approach, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications, and the invention has been found to be particularly suited for content routing on a network such as the Internet, as a function of authorization-type data, such as an electronic token, generated to facilitate the routing. While the present invention is not necessarily limited to such applications, various aspects of the invention may be appreciated through a discussion of various examples using this context.

According to an example embodiment of the present invention, a network routing system is adapted for selectively communicating data between a home network node and a user providing an electronic token via which the user accesses the home network node. The home network node typically includes, e.g., one or more of a personal computer, set top box, web camera, secure monitoring system and/or content storage system at a home or business location with network (e.g., Internet) access. In this context, a "user" accessing the home network node (e.g., using a remote network access appliance) may include one or more individuals, such as members of a household, employees of a business entity or simply an individual given access authorization by a user associated with the home network node. Further, a "user" may be a machine functioning automatically, for example, as programmed by an individual.

The electronic token (e.g., a data file) includes information sufficient to facilitate remote access to data at the home node, using authentication-type data such as a username and security criteria such as a pass code. This information in the token may, for example, be a pointer that identifies data that is used to facilitate the remote access, or may directly include such information. Where appropriate, the token also includes information that identifies conditions relative to data access, such as by specifying particular types and/or locations of data that can or cannot be accessed by the particular user specified in the token. The token is implemented in one or more of a variety of manners, depending upon conditions such as the available equipment and software, available communications networks, the type of access being requested, the configuration of the home network node and the type of appliance to which remote access is granted.

The token is made available in a variety of manners. In some applications, the token is provided directly by a user seeking access, where the user sends the token to the home network node and/or to a host server facilitating the communication of the token and/or other data between home nodes and remote access appliances. In other applications, the token is stored at an accessible location such as at a host server as discussed above, with the stored token provided on behalf of a user seeking access to the home node. The token may be provided, for example, using an SMTP message, with the token in the message and/or with information for accessing the token in the message, such as a URL bearing the token or directing a user to a token at the URL. In still other applications, a first user at a remote node generates and provides the token to a second user at a remote node, with the second user accessing the home node as a function of the token.

In applications involving a host server, the host server provides a personal network service that connects the user, with software implemented at the home network node, to data available at the home network node in response to the token provided by the user. The host server facilitates an intelligent interface accessible by the user at a remote network access appliance and further facilitates the selection and delivery of data from the home network node to the network access appliance, in accordance with information in the provided token (e.g., the information selectively granting access to data at the home network node).

In the context of various examples described herein and shown in the figures, reference is made to several representative devices, networks and network communication approaches. Various terms such as Internet, web-enabled, packet and others are used in the context of different embodiments to facilitate the description of different examples. However, the devices, networks and network communications approaches described in connection with these example embodiments may be applicable to variety implementations and descriptive terms. For instance, devices that are described as a web-enabled or Internet appliance may include one or more devices that communicate over a path characterized by one or more of a packet-communicative, web-based and/or Internet-based communications link. In this regard, devices referred to as web-enabled or Internet-related are selectively implemented using one or more of a variety of packet-communicative approaches. Such devices may, for example, access the Internet via non-Internet-based communications approach, such as via one or more wired and/or wireless links that use one or more of a variety of communications approaches. Moreover, packet-communicative approaches described herein are applicable to a variety of network communications approaches, including those involving communications referred to in connection with one or more terms relating to packet, frame, block, cell and segment terms.

In one example embodiment, access to data stored on a home network node is controlled using a browser gateway implemented at the host server. In some applications, the browser gateway parses a user-provided token bearing authentication and identification-type information and uses information in the token to control access to data by a particular user specified by the token. In other applications, the browser gateway sends token information to an authentication-type server to obtain authentication for the token, with the authentication-type server sending a response to the browser gateway, which in turn uses the response to grant access. In either application, the browser gateway uses the token to authenticate the user communicating the token, obtains an access control list for the user (directly or indirectly via the token) and applies the access control list to the request. If the user communicating the token is authenticated, and if the requested access meets conditions of the access control list, the browser gateway provides the requested access to the user, for example by connecting the user at a remote network appliance to data at the home network node.

In some applications, data to which token-based access is granted is configured for use at a remote network access appliance using information characterizing programming available at the remote network access appliance, with such programming information included with the token data. The information provided with the token may, for example, be used to facilitate the presentation of application-specific data at the remote network access appliance without necessarily implementing an application to which the data is specific. In general, application-specific data may include data specific to a particular program application, or a type of data that can be implemented with a variety of program applications such as JPEG image data. With this approach, a user at the remote network access appliance is thus connected to a home network node in the sense that the user can implement a token to receive information stored at the home network node, directly and/or via the host server. Furthermore, this connection can be facilitated via a the remote network access appliance that need not necessarily understand or process application-specific information in order to display or otherwise make application-specific information available. For instance, data created with and/or stored in connection with a particular software program at the home network node can be viewed or otherwise accessed at the remote network access appliance, without necessarily using the particular software program at the remote network access appliance.

Turning now to the figures, FIG. 1 is a system 100 for configuring and routing data via an internet protocol network using a server-hosted interface, according to another example embodiment of the present invention. The system 100 includes a network-based server 110 that hosts the interface, a plurality of remote network access appliances 120-i via which registered and guest users participate, and a plurality of home network nodes 130-N, all of which communicate via a network 105. The remote network access appliances 120-i are web-enabled and/or otherwise capable of communicating using packet-based communications approaches (i.e., are packet-communicating devices). These remote network access appliances 120-*i* may include, for example, one or more of a personal computer, a mobile telephone, a personal data assistant, a digital audio player, a camera, a video device or other devices that communicate using, for example, packet-based data. Similarly, the home network nodes 130-N (i.e., packet-communicating devices) are web-enabled and/or otherwise communicate using packet-based approaches, and include one or more devices such as a home or business personal computer, that can access stored data such as media stored at a local hard disk drive, video storage device or other data storage device. Such devices are readily implemented with FIG. 1 and the various example embodiments discussed therewith, as well as with other embodiments discussed above and with the other figures, as a source of data and/or as a destination to which token-based data access is facilitated.

The network 105 includes a packet-based network such as the Internet and, where appropriate, one or more other networks such as a mobile telephone network or a local area network (LAN), each of which selectively forms part of the network. In some applications, the network 105 includes a local area network implemented for a locality such as a home or business. In other applications, the network 105 is or includes a virtual network or set of virtual application communication channels within a processor or group of processors associated with a computing appliance.

The network-based server 110 includes a host application router 112 that interacts with user application routers at each home network node and hosts the interface, for example, as an Internet web page. In this regard, each home network node includes such a user application router, with home network node 130 shown including a user application router 132. The user and host application routers work together to make up a network-distributed router, the host application router 112 operating personal network-distributed routers for each user, such that each user's personal router (e.g., each user's personal network) includes that user's application(s) at the user's home network node(s) operating together with the host application router 112. In some applications, the user application router 132 is configured at the network-based server 110 and downloaded to home network nodes as a software download, and implemented on an appliance such as a personal computer or a network router. Each user can thus access his/her data at the user's home network node or nodes, using his/her personal router and data at the user's home network node(s).

Using the interface, the network-based server 110 selectively facilitates controlled (i.e., using a token) user access to data at one or more of the home network nodes 130-N, via one of the remote network access appliances 120-*i*. The network-based server 110 implements authorization criteria 114 for authenticating a particular user in response to a request for access to data via one of the home network nodes 130-N or one of the remote network access appliances 120-*i*. In this regard, when a user at a remote network access appliance requests data such as image, audio and/or video media content from a particular home network node, the network-based server 110 processes an authorization for the request by the user using the authorization criteria 114. If the authorization is successful (e.g., authorization criteria are met), the network-based server 110 facilitates the communication of data from one or more of the home network nodes 130-N to one of the remote network access appliances 120-*i* to which the user requested data.

The data communicated to one of the remote network access appliances 120-*i* is selectively configured at the direction of the network-based server 110 for use at the remote network access appliance. For example, where requested data from home network node 130 is application-specific data that is implemented using a particular application program, the network-based server 110 controls, via one or both of the host application router 112 and the U.A.R. 132, the configuration of the data into a format that is usable by a requesting remote network access appliance (e.g., 120). That is, where the remote network access appliance 120 has an application program capable of implementing the requested data (e.g., by displaying or otherwise presenting data to a user), the requested data is not necessarily configured into a different format. Where the remote network access appliance is incapable of implementing the requested data, or where transfer of the data in a different format is desirable (e.g., to reduce transfer bandwidth), the requested data is reconfigured into a format such that it can be implemented at the remote network access appliance. For instance, where the requested data requires a particular word processing program and the remote network access appliance is to view the data using a web browser, one or both of the host application router 112 and the U.A.R. 132 work to configure the requested data into a format that can be implemented by a web browser. In various applications, user-preference or other data characterizing the configuration of data is specified in a token used to access the data.

In some applications, the configuration of data is implemented using a plug-in at the home network node that is adapted to access information tagged to stored data in order to present the data to a remote network access appliance. A user at the remote network access appliance can thus make selections for data transfer in accordance with the tagged data (e.g., by requesting a particular category of data or by using a token specifying a category of data). The plug-in then uses the selection and facilitates the transfer of the requested data. Where appropriate, a MIME handler plug-in is implemented to transcode the requested data into a MIME type that can be implemented by the remote network access appliance via which the request has been made. These plug-in approaches may, for example, be implemented in a manner similar to that discussed in connection with FIG. 2A and others below.

The network-based server 110 also stores and uses configuration data 116 that includes a variety of configuration information used by the host application router 112 to facilitate the transfer of data on behalf of a user. The configuration data 116 is generally provided by users and further augmented by the network-based server 110 to include information useful in processing information on behalf of each user. The configuration data 116 may also include information from one or more service providers associated with users of the system, with the configuration data including, for example, global and/or specific policies related to each user's system use. Furthermore, the configuration data 116 is selectively implemented at one or more home network nodes, and can be used for a variety of U.A.R. functions.

The configuration data 116 typically includes user preferences relating to a variety of user-specific functions, such as the type of interface presented to each user, the manner in which to present and/or deliver available content, accessibility limitations (e.g., to associated users) and data transfer characteristics. For instance, where a user prefers the delivery of a particular format of data to his/her remote network access appliance, or where capabilities of the appliance require a particular format, that user may specify the format in user preferences. The host application router 112 and/or the U.A.R. 132 accordingly works to format the data appropriately before sending the data to the user's remote network access appliance. Similarly, where the remote network access appliance is limited in application to a particular format, data sent to the remote network access appliance is configured into such a particular format. In addition, where appropriate, the host application router 112 and/or the U.A.R. 132 access requesting remote network access appliances to determine a usable data format type and format the requested data appropriately. In certain applications, data requests from remote network access appliances include such formatting information, with the host application router 112 and/or U.A.R. 132 implementing the formatting information in the request. These approaches may involve implementing the user application router at the user's home network node for formatting the data and/or formatting the data at the network-based server 110.

The configuration data 116 further includes information used by the network-based server 110 to communicate with and/or access each user's home network node, such as the home network node's address relative to the network 105 (e.g., each user's IP address and/or name space address) and security information. Where a user has more than one home network node, such as with a household "user" having different computers used by different household members, or wherein different "home" nodes are located at different places on a network, the configuration data 116 reflects these multiple home network nodes. User access with multiple home network nodes in a household typically involves the network-based server providing an interface for, and access to, multiple computers to individuals associated with the household or business (and having the corresponding authorization). User access with multiple home network nodes across a network wherein, for example, a user has different home network node locations such as different places of residence and/or business, similarly involves the provision of access to multiple computers at different locations on a network, with a portion of a routing controller implemented at each location.

One particular user access approach involving multiple "home" nodes involves user access to multiple network-based home network nodes from which the user is authorized to access data via a token or otherwise. For example, where a user at the remote network access appliance 120 purchases data such as a movie, music or software, a content provider having multiple home source nodes at which the data or media is located can grant the user access to these multiple nodes for downloading the purchased data. The content provider prepares and sends a token to the user at the remote network access appliance 120 upon purchase of the data; the user can then use the token to access and/or otherwise download the purchased data. In this regard, a user can download data for a single purchase from multiple sources, thus speeding up the delivery of data. This approach may also involve the use of different home network nodes implemented by users subscribing to a particular service, with each user making data available at his or her home network node for subsequent transfer to an end user at a remote network access appliance. In these instances, the host application router 112 works with user application routers at each involved home network node to manage the data transfer.

In some applications, the network-based server 110 grants access to information at multiple home network nodes to a particular user, based upon the above-discussed authorization. For example, users may have more than one home network node, such as two or more computers on a home or business network, or two or more computers on separate networks. The network-based server 110 works with user application routers at each home network node to make content available the user, when the user is so authorized (e.g., by possessing and communicating a token). Where used to show available data, the interface is configured to display data from all home network nodes to which a particular user is authorized access.

Depending upon the particular application and type of data being transferred, the network-based server 110 tracks the transfer of data between the home network nodes 130-N and the remote network access appliances 120-$i$. In some applications, the network-based server 110 tracks the transfer of data by tracking the use of tokens specifying data to be transferred. Where data having associated media rights (e.g., copyright protection) is transferred, the network-based server 110 tracks the transfer of the data to ensure that regulations associated with particular media rights are followed. For instance, where purchased music is transferred, rights associated with the music may limit the distribution of the music to users other than the purchaser. In this regard, the network-based server 110 tracks any transfer of purchased music to ensure that applicable regulations are met.

The system 100 is adapted to work in a variety of environments involving disparate networks, home network node devices, remote network access appliances, data and characteristics thereof. One particular scenario involves remote data access as follows. When a particular user who is party to the home network node 130 (e.g., a homeowner having media content stored at his or her home computer) wishes to establish remote access, the user signs up for a service provided via the network-based server 110. The network-based server 110 prompts the user for access information to the user's home network node 130 so that the host application router 112 can interact with the user's home network node. This access information includes sufficient information for identifying the home network node 130 on the network 105 and other appropriate information, such as data locations at the home network node 130 that are accessible by the network-based server (and/or by remote network access appliances). The access information is stored with the configuration data 116, together with other information for the user as appropriate for the particular implementation.

The user application router 132 (software implemented, e.g., on the user's home computer, router or other network appliance) is installed at the user's home network node 130 and is configured for operation in connection with the host application router 112. In some instances, some of the functions discussed as carried out with the host application router 112 are established and/or implemented at the user application router 132, such as the limiting of access to particular data locations at the home network node 130.

An account is established for the user, with service type information (e.g., billing information) at the network-based server 110. The account includes authorization information established with the user, which is presented to the user for use in accessing the network-based server and, accordingly, his/her home network node 130 as well as account information via the network-based server. This authorization information is stored with authorization criteria 114.

The user employs the remote network access appliance 120 for accessing data at the home network node 130 by visiting the interface (e.g., web browser) presented by the network-based server 110 on behalf of the user and, where appropriate, by communicating a token to the network-based server. In some applications, a user application router type function is also implemented at the remote network access appliance 120. This data access may involve, for example, the use of an Internet-capable mobile telephone as the remote network access appliance 120, with the interface being accessed as a web page via the mobile telephone. The user provides authorization information to the network-based server 110 via the interface. The authorization information may involve one or both of user-input authorization information (e.g., a password or voice for voice recognition) and identification information associated with the remote network access appliance 120, as included with or independent from a token. The network-based server 110 uses the authorization information together with the authorization criteria 114 to determine whether access is authorized.

Once the user has been authorized via the remote network access appliance 120, the network-based server provides the user with information regarding available data such as media content via the interface, viewed as a web page. One or both of the home network node 130 and the network-based server 110 provide some of or the entire interface and a listing of available data for transfer. The listing of data may be tailored to a particular user's preferences, device capabilities, or otherwise limited in scope to restrict the data to which a particular user has access. The user selects data for transfer and the host application router 112 responds by interacting with the home application router 132 to facilitate the transfer of data to the remote network access appliance 120. This data transfer is carried out in accordance with the user's selection and the configuration data 116.

Where the selected data requires formatting, such as where the user's remote network access appliance 120 desirably receives data in a particular format as discussed above, the host and user application routers 112 and 132 work to format the data using, for example, the information stored at a home network node and functionality of the remote network access appliance. For instance, where data is music and wherein the remote network access appliance 120 desirably plays music in a first format but the music is stored at the home network node 130 in a second format, the music data is formatted into the first format prior to transfer to the remote network access appliance. The formatting is generally carried out at one or both of the home network node 130 and the network-based server 110, depending upon the particular application. In some applications, the user application router 132 formats the data, prior to transfer to the remote network access appliance 120. The data is then transferred from the home network node 130 to the remote network access appliance 120, via the network-based server 110 and/or directly via the network 105.

In some applications, the formatting involves the implementation of metadata, where available, associated with an application at the home network node 130 to categorize or otherwise present the data to the remote network access appliance 120. For example, where a user requests a list of data falling under a particular identification type, such as all image data (e.g., a photo album), metadata that describes the data as image data is used to identify the data. The identified data is presented in a format amenable to display at the remote network access appliance 120. In some applications, the displayed data is identification data, from which a user can select specific data for actual transfer of content (e.g., images) corresponding to the identification data. The selection is communicated to the home network node 130, which responds by configuring the selected data for use at the remote network access appliance 120 and facilitates the communication thereof.

The type of format in which data is desirably received at a particular remote network access appliance is set in one or more of a variety of manners. In one application, the configuration data 116 includes information regarding the format of data for a particular network access appliance as described above; when a user requests data for that particular appliance, the network-based server 110 works with the home network node to set the data in the format indicated in the configuration data. In another application, users manually select a data format when requesting data via a remote network access appliance. In other applications, the data format is automatically selected by one or both of the network-based server 110 and the home network node to which access is requested, using information identifying the type and/or abilities of the network access appliance to which the data is to be transferred (e.g., as included in the request communication therefrom).

Referring again to the above scenario, another data transfer approach involves the delivery of streaming data to the remote network access appliance 120 via the network-based server 110. Streaming data may involve, for example, the passage of data from a streaming data appliance, such as a television tuner, a video camera or a radio receiver, or the streaming of data from a network-based streaming source, such as an Internet radio station or other live broadcast source, or from a network-based video source. This streaming of data may also involve the application of subscription content services or other fee-based use authorization that is implemented in connection with the data transfer and is applicable, for example, on a user-specific basis. Such subscription content services may include, for example, television, radio or gaming services available over one or more of a multitude of mediums. Further, non-subscription content services, such as those available free over the air (i.e., via local television or radio stations) are selectively routed or streamed in a similar manner.

The host and user application routers 112 and 132 work to configure the streaming data in a proper format and, further, to transfer the data at a desirable transfer rate, relative to available bandwidth. The transfer rate may, for example, be relative to the condition of the network 105 and may further be characterized by transfer-related characteristics such as quality of network connection and associated functions, such as buffer size and approach. Further, the format is optionally carried out as a condition of the network 105 and/or the remote network access appliance 120, as relative to available transfer rate and/or as relative to the type of data amenable for use at the remote network access appliance. For instance, where a user requests streaming music from the home network node 130, the available transfer rate is used to select the format of the music. Where available transfer rate is low such as with a mobile telephone network, lower bit rate data is used to reduce the amount of data required to be transferred for the selected music (and, accordingly, also resulting in relatively lower quality audio). Where available transfer rate is high, such as with a high-speed Internet link such as a DSL link, high bit rate data is used, facilitating high-quality music listening.

In some streaming applications, streaming data is protected or otherwise controlled using one or more of a variety of approaches to comply, e.g., with rights associated with the data or other applicable rights, such as those implemented by government agencies in association with the delivery of data. For example, where streaming media is protected by media rights, the application router uses protection to ensure that the transfer adheres to associated media rights. A variety of protection approaches, such as those discussed below, are implemented in accordance with the particular application and data use characteristics of the particular remote access appliance that will be using the data.

Where streaming data is subject to government type rules, such as those associated with the rebroadcast of a television or radio broadcast or rules, the application router transfers the data (or prevents the transfer of data) in connection with the rules. For instance, where the rebroadcast of a television broadcast is not permitted, the application router transfers data to ensure that any user receiving the broadcast is doing so without introducing issues relating to the rebroadcast such as by ensuring that an end user receiving the broadcast is entitled to do so as an original broadcast. Such rebroadcast may be facilitated in accordance with, e.g., conventional transfer of broadcast data to a remote television in one's own home.

In some applications involving the transfer of streaming data such as television data, the application router ensures compliance with blackout rules associated with a location in which the remote network access appliance exists. For example, where the broadcast of a particular streaming television signal is subject to blackout rules, such that the signal is not to be broadcast in a certain geographical region, the application router determines the location of the remote network access appliance before facilitating the transfer of the streaming data. Where the location of the remote network access appliance is in compliance with blackout rules, the application router enables the transfer of streaming data, and where the location is not in compliance with blackout rules, the application router disables the transfer of streaming data.

In one application involving a mobile telephone as a remote network access appliance, the application router identifies the location of the mobile telephone before enabling the transfer of data such as streaming data subject to blackout rules or other localization information. This identification may be facilitated using, for example, the identification of a local transmission location (e.g., a transmission tower or GPS) via which the mobile telephone communicates. When the location of the mobile telephone is determined, that location is used to determine whether the transfer of streaming data is appropriate, and the transfer is carried out (or not carried out) appropriately.

In another example embodiment, the network-based server 110 facilitates the transfer of data from one of the remote network access appliances 120-i to one of the home network nodes 130-N, using an authorization approach similar to that discussed above. For example, when a user at the remote network access appliance 120 wishes to send an image to his/her home network node 130, that user accesses the interface provided via the network-based server 110. Once authorized, the user uploads the image to the home network node 130, which responds by accepting the image and storing the image locally. With this approach, image storage is facilitated with the remote network access appliance 120 while utilizing the data storage capabilities of the home network node 130. When implemented with a camera device, the remote network access appliance 120 enjoys a large quantity of storage space for pictures relative, e.g., to conventional cameras (and camera phones) where space is limited to storage at the camera. Further, when images are uploaded to the home network node 130, adverse conditions such as lost or stolen cameras or camera phones do not necessarily suffer an associated loss of image data, relative to conventional approaches where images are stored at the camera or camera phone.

Some applications involving the selective transfer of data use a token or other deliverable authentication data to authenticate or otherwise enable a user to access and, where appropriate, use data. The token generally includes authorization information that is sent to a user at a remote network access appliance. For example, an electronic token may include a link to a particular web page hosted by the network-based server 110, with security type information embedded in the token for use in granting access to data stored at a home network node. In addition, the token may also include information that can be used to link an end user with data, such as an identification of a storage location for the data. Furthermore, the token may include information specifying the type of data that can be used at a node from which a request for the data is made.

The token is generated using one or both of the host application router 112 and a user application router (e.g., 132) at the home network node from which data is transferred. In some applications, a user accessing his or her home network node via a remote network access appliance causes the home network node and/or the host application router 112 to generate the token. A home network node user then sends the token, such as via email, to an end user at a remote network access appliance. In some applications, the home network node and end users may be the same person, for example where a particular user wishes to access his or her own data at a home network node, when using a remote network access appliance.

A user at a remote network access appliance receiving such a token uses the token in one or more of a variety of ways to communicate with the network-based server 110 and ultimately to facilitate the transfer of data from a particular home network node to which the token applies. In some applications, the end user implements the token directly, e.g., by clicking on a link associated with the token as sent in an electronic communication such as an email or instant message, or otherwise sending information associated with the token to the network-based server 110. Certain applications also require an end user to supply a password or other security criteria when implementing the token.

In some contexts, the token is implemented with a transmission report. That is, where a particular user at a remote network access appliance receives a token, that user sends a transmission report (e.g., by clicking on a link provided with the token) that is sent back to the network router. The network router (implemented at one or both of the host application router 112 and the user application router 132) in turn sends authentication and/or security information to the user at the remote network access appliance to make transferred data usable thereat. This approach may be implemented, for example, where the token includes a link to the data, where the token includes the data or where the token is delivered along with the data.

Certain implementations involve the use of tokens having a lifetime, with the tokens usable more than once. For instance, where a token provides access to a particular media file or files, a user holding the token at his or her network access appliance can access the particular media file or files throughout the lifetime of the token. In addition, when updates are made to the media file or files to which the token applies, notification can be sent to a user holding the token. For example, where a token grants access to a file including a personal digital photo album shared by multiple family members, each having token access, updates to the photo album can be announced to the family members.

Another example embodiment is directed to the use of a token for promotional purposes, where user reaction to the token is tracked and used for promotions. For example, a token may include information enabling a user at a mobile telephone to access and download a ring tone that is a short music clip. If the user likes the ring tone and subsequently purchases music relating to the clip (or otherwise), information in the token is used to track that purchase. In some applications, a royalty (e.g., funds, service or other item of value) is given relative to the tracked purchase. The royalty may be facilitated, for example, by tracking the source of the token and giving that source a royalty based upon the purchase.

In another implementation, the network-based server 110 is configured for processing requests for data transfer in accordance with media rights associated with the data. Media (or other data) rights are often the subject of rules, regulations, contracts or other agreements relating to the rights associated with the data, which may or may not be included in a token or other access/authorization approach. In this regard, these rules, regulations, contracts or other agreements are implemented to ensure that any transfer of the data complies with these agreements. For instance, as discussed above, certain data such as media is protected by copyright or other digital rights management (DRM) protection. Where the transfer of the protected data needs to comply with particular rules or regulations, the network-based server 110 and corresponding home network node are configured, via the host application router 112 and the user application router at the corresponding home network node, to take steps to ensure the transfer of data is in compliance.

For example, where a user at the remote network access appliance 120 requests the delivery of protected data via a provided token, the host application router 112 works with the user application router 132 to process and transfer the requested data accordingly. In some applications, this transfer involves simply passing protected data to the remote network access appliance 120, which processes the data with protection for use. In applications where the remote network access appliance 120 cannot process data in a particular protected format or where the passage of protected data is undesirable, the application router configures the data into a protected or unprotected format that can be used by the remote network access appliance.

In some applications, the network-based server 110 blocks access to certain files relative to the type of file and applicable regulations regarding the transfer of the type of file. For example, access to protected media may be blocked to any user other than a user verified as being the owner of the protected media, e.g., where a user at home network node 130 makes data available to his or her personal remote network access appliance 120 by way of a token. Other users implementing a similar (or the same) token may be inhibited in their access where verification of that user's identity is used to authorize the implementation of the token.

In certain implementations, the network-based server 110 tracks the transfer of protected data and, where appropriate, reports irregularities or potential abuses. For instance, where a password for controlling user-specific access to protected media is used by more than one user at a time, or used at a relatively high frequency, the network-based server 110 can detect these uses and flag the use as potentially in violation of relevant media rights. Such an approach addresses the potential of users illegally sharing their information with others. Relative to the token approach discussed above, the frequency and timing of token use and/or an identification of appliances using the tokens, can be similarly tracked and used to identify any irregularities. In some implementations, a user's account is automatically shut down, effectively stopping any transfer of data, upon detection of a potential irregularity.

Data (e.g., media) rights are protected in a variety of manners. In some implementations, encryption, password protection or forward-blocking approaches (i.e., preventing received data from being re-forwarded) are used to ensure that protected content is transferred in compliance with applicable rules. These approaches may be implemented in connection with the original protection applied to data or with re-protection, where the application router removes the original protection and re-protects the data for delivery to a remote network access appliance.

For certain applications requiring the delivery of data in accordance with particular protection approaches, such as those implemented with relevant communication rules and/or laws, the host and user application routers 112 and 132 use some or all of these approaches to ensure compliance. In some applications, the application router removes the original protection from data and sends the data in an unprotected format to a remote user, where such unprotected delivery is acceptable (e.g., where delivery to a particular user's remote network access appliance is in compliance with applicable rules). In other applications, the application router re-protects the data in a manner such that the data can be processed by the remote network access appliance. Still other applications involve the use of a token as discussed above, with the token including, for example, authorization for a particular user to receive and use data, or application software that facilitates the use of protected data at a remote network access appliance.

In another example embodiment, the application router implemented with the host application router 112 and a user application router (e.g., 132) is configured to select a particular communications medium in the network 105 to use in sending data to a remote network access appliance. For example, certain remote network access appliances are capable of connecting to different networks (e.g., implemented as represented by the network 105). Mobile telephones are one example type of remote network access appliance that can be used in connection with such an approach, where a particular telephone may be capable of receiving data over different communications links (e.g., via a GSM (global system for mobile communications) link, a CDMA (code division multiple access) link or a local wireless internet link). In this regard, where multiple networks are available and where a particular network access appliance to which data is to be transferred is capable of receiving information via the multiple networks, the application router selects one of the networks via which to send data.

One application involving the above-mentioned approach to communications medium selection involves the use of a mobile telephone or other device configured to communicate via both a mobile telephone network such as a GSM network and a local wireless internet link (e.g., commonly referred to as "wi-fi"). Where a mobile telephone network is available (as typically readily available for telephony communications), telephone and/or data communications can be sent via the mobile telephone network. Where a wireless internet network link is available, data communications can be selectively sent via the wireless internet network link, generally facilitating higher data transfer rates than mobile telephone links and, in many instances, relatively more economical data transfer. The wireless internet link is also used for telephony communications, e.g., where the mobile telephone is configured for internet protocol (IP) telephony type communications.

The combination wireless internet/mobile telephone capable phone can be used in a multitude of manners, depending upon the particular application, available networks, user configuration and service provider conditions. For instance, when such a mobile telephone is used in an area offering no wireless internet link, or where any wireless internet link is not robustly available, the mobile telephone network is used for data and voice communications. Conditions relative to wireless internet availability may be detected, for example, by the telephone itself or by the network-based server 110, e.g., by using information associated with an identified mobile telephone communications source such as a transmission tower. When the mobile telephone has access to a wireless interne link, the link is used for communicating data and, in particular, for communicating data having a relatively large size (and thus benefiting from high bandwidth communications and potential lower cost communications channels). Such wireless links are typically available, for example, in airports, coffee shops, educational institutions or other locations where a wireless interne link is desirable; furthermore, as wireless internet technology grows, these links are becoming more widespread and are implemented publicly in a variety of regional locations. Information characterizing the particular links available, or otherwise specifying a particular type of link needed (e.g., to suit the delivery of a particularly large amount of data), is selectively implemented with tokens provided to remote users, or in some applications, is automatically included with tokens at a remote device in response to available links.

In some applications, configuration settings in the mobile telephone, at the network-distributed application router or at other nodes in the system 100 are set to control the delivery of data to the mobile telephone as a function of the availability of a wireless network. For example, where a user requests data such as a movie or a presentation having a relatively large data file size, settings at one or more locations in the system 100 may be configured to transfer the data when a wireless internet link is available to the mobile telephone. In this regard, user configuration may be implemented to make wireless internet transfer a desirable option for data files over a certain size, with an option to override the settings to effect transfer over a mobile telephone network. This approach may be useful, for example, where immediate data transfer is not necessary or where a user elects to wait to transfer data until a wireless internet link becomes available for economic or other reasons. In this regard, a user can request a particular set of data and the network-distributed application router (112 and/or 132) can be implemented to automatically transfer the requested data when a wireless internet link becomes available to the mobile telephone or when a user specifically initiates the transfer.

Another example embodiment relative to the use/selection of wireless internet networks and a mobile telephone network involves the transfer of data from a remote network access appliance (e.g., remote network access appliance 120 to home network node 130 in FIG. 1). The transfer of data in this direction may be managed in a manner that is similar to the management of data transfer from the home network node to a remote network access appliance. For example, where a video or picture(s) is taken with a mobile telephone, the file size associated with that video or picture(s) may be large. In this regard, the information can be selectively transferred to the home network node relative to the availability of a wireless network. One such application involves the use of a camera phone; when a user has taken several pictures, those pictures can be uploaded to his or her home network node when a wireless network is available. With this application, photos taken can be securely stored at a home network node while freeing up space at the camera phone for taking additional pictures. Many other applications (e.g., video) are implemented in a similar manner.

Referring again to FIG. 1, the selection of a particular network over which to send data as specified in a token or otherwise may involve the consideration of one or more of a variety of network characteristics, such as transfer rate, reliability, availability, rights protection, cost and others including, for example, those discussed above. Users employing the network-based server 110 for the transfer of data may also provide user-specific data regarding preferences for data transfer in the realm of multiple available types of networks. The preferences may be provided in the form of configuration data 116 that the application router can access and use in selecting a particular data transfer network or time, or may involve a selection by a user at a remote network access appliance made in connection with a particular data transfer event. These user preferences or selections may involve the direct selection of a particular network or, for example, the selection of criteria for use by the network router in selecting a network on behalf of a user. In this regard, the application router employs criteria in selecting a particular network via which to send data and, in some applications, in selecting a particular time during which to send the data.

In another example embodiment of the present invention, a smart cache 140 is implemented with the system 100 for storing (caching) data to be transferred over the network 105 to one or more of the remote network access appliances 120-$i$. The smart cache 140 is configured for storing data and accordingly involves devices such as a database system or other data storage arrangement accessible by the network-based server 110. The smart cache 140, while shown as a separate arrangement, can be selectively implemented with one or more of the devices/networks shown in the system 100, such as with the home network node 130, the network 105, the network-based server 110 (or a different network-based server) or a remote network access appliance 120. In some applications, data in the smart cache 140 includes data belonging to a particular asset space and, where that asset space is accessed by a remote network access appliance, the data in the smart cache is made available. Where a token references data that is stored in a smart cache 140, that reference may be directly to the smart cache or to a location where the data in the smart cache originates from, where a pointer or other information directs the network-based server 110 to access the appropriate location in the smart cache.

When data is transferred between one or more of the home network nodes 130-N and one or more of the remote network access appliances 120-$i$, the smart cache 140 can be implemented as a buffer and/or storage arrangement. For example, when a user at home network node 130 wishes to make selected audio data (e.g., certain music) available to his or her mobile telephone or other remote network access appliance, that user can initiate data transfer, using the host application router 112 together with the user application router 132 to the smart cache 140. In addition, where data is to be configured for implementation at a remote network access appliance, the smart cache can be sued for storing data from the home network node, with the host application router 112 facilitating the configuration of the stored data into a format amenable to the remote network access appliance, and subsequent transfer of the configured data. This data is then available for subsequent download and/or streaming to the user's remote device. In a reverse transfer application, data can be transferred from a remote network access appliance to the smart cache 140, irregardless of availability of a particular home network node to which the data is sent. Subsequently, the home network node can access the smart cache 140 to retrieve the data. With these approaches, a home network node or remote network access appliance need not necessarily be accessible to facilitate a transfer of data. Furthermore, where transfer of data involves the transfer of streaming data, the smart cache 140 can be implemented as a buffer to accommodate potential problems with communicating over one or more links in the network 105, or simply to pause the stream of data (e.g., to pause video and/or audio playback).

Another application of the smart cache 140 involves the cache implemented at a home network node, such as in a personal computer or with a storage device at the home network node 130. Generally, where a user application router 132 is active and the cache is active (or can be activated by the user application router 132), access to the cache is available to a remote network access appliance. In this regard, a user at an appliance such as a personal computer can transfer data to the smart cache 140. Once transferred, the personal computer or other appliance can be shut down while ensuring that the data is available in the cache for access. For example, where a network attached storage (NAS) device is implemented at the home network node 130, a user at a PC at the home network node can designate a particular file in the NAS to be available for data transfer. The NAS (or a file therein) acts together with the user application router 132 as the smart cache 140; access and data transfer are effected in a manner similar to those discussed herein.

In some applications, the user application router 132 administers the storage of data in the smart cache 140 using conditions relative to the particular type of data transfer scenario in which the smart cache 140 is implemented. Where use of the smart cache 140 is appropriate or otherwise beneficial, the user application router 132, possibly in connection with the host application router 112, facilitates that use by automatically managing transfer to and from the smart cache. In other applications, a user at a home network node or remote network access appliance manually directs the storage and/or retrieval of data at the smart cache 140, such as by physically storing information at a local or remote data storage (cache) location. Depending upon user selections, certain data may be stored in the smart cache 140 based on a rule implemented with the user application router 132, such as for data a particular user needs to access on a regular basis or for data requiring a long time for transfer, such as video data.

In some applications, the network-distributed application router accesses the smart cache 140 using a protocol-based approach for retrieving data. For example, where a user at the remote network access appliance 120 requests data made available via the home network node 130, the network-distributed application router ascertains whether the requested data is available in the smart cache 140. If the data is available at the smart cache 140, the data is transferred to the remote network access appliance 120. If the data is not available at the smart cache 140, the network-distributed application routing controller accesses the home network node 130 to retrieve the data.

When data is undergoing transfer to the smart cache 140, one or both of the user application router 132 and the host application router 112 monitor the data transfer and, where appropriate, communicates with the device making the transfer to ensure that the transfer is effected properly. For example, where a user elects to transfer data from his or her PC to the smart cache 140, the transfer is monitored to ensure that it is successful. For instance, if a user attempts to shut down his or her PC or otherwise interrupt the transfer, a warning communication (e.g., a pop-up message on a PC monitor) is generated to alert the user that the transfer has not been completed.

In another embodiment involving the smart cache 140, video is streamed to a remote network access appliance using the smart cache to store some or all of the video as a buffer. For example, where a user orders a movie, via a home network node 130, to be downloaded for playback at a remote network access appliance 120, a selected amount of the video data for the movie can be stored at the smart cache 140. Once playback is started, data sent for playback is deleted from the cache 140 or otherwise made inaccessible, with remaining data for the movie being sent to the cache 140 or, in some instances, directly to the remote network access appliance 120. In some applications, the movie data stored at the smart cache 140 is unusable at the remote network access appliance (or any appliance) until an enabling stream of data, such as that involving encryption information or video data, is sent to the remote network access appliance. This enabling stream of data is used to make the movie data available at the remote network access appliance. With these approaches, movie data is transferred, with at least a portion of the movie data stored in the smart cache 140, while maintaining relevant media rights to the movie in that a usable copy of the movie is not necessarily stored at any location.

Other applications are directed to a token approach, similar to that discussed above, using the smart cache 140 to store information to which a token is directed. For example, where a user at a home network node sends a token for use at a remote network access appliance for retrieving a particular set of data, the particular set of data can be stored in the smart cache 140. The token may, for example, point to the section of the smart cache 140 in which the data is stored. When a user at a remote network access appliance implements the token, the particular set of data at the smart cache is sent to the remote network access appliance.

The home network node 130 and user application router 132 are implemented in a variety of manners, depending upon the application. In some applications, the user application router 132 is located at a home computing device such as a desktop or laptop computer. In other applications, the user application router 132 is programmed into a router, modem, data storage device or other user device implemented in a home, office or other (generally local) network system. Furthermore, the user application router 132 can be implemented with one of the remote network access appliances 120-*i* in certain applications.

Figure 2:
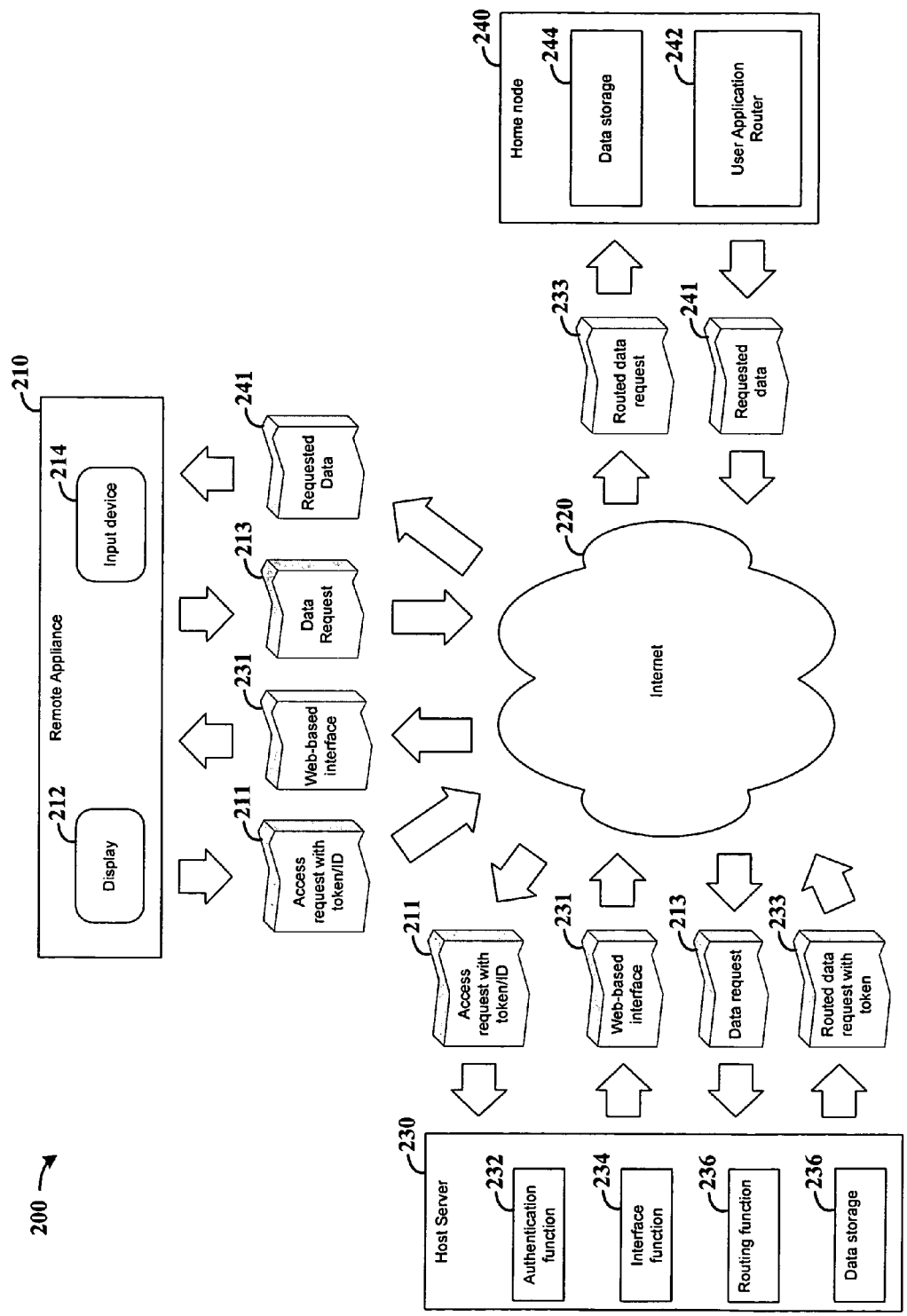
FIG. 2 shows a token-based communications arrangement, according to another example embodiment of the present invention.

FIG. 2 shows a token-based communications arrangement 200, according to another example embodiment of the present invention. The arrangement 200 includes a host server arrangement 230 that communicates with a plurality of home nodes and remote appliances via the Internet 220. For discussion purposes, the host server 230 is shown facilitating data transfer with a particular remote appliance 210 and a particular home node 240 (e.g., both packet-communicating devices). However, a variety of home nodes and remote appliances interact with the host server, depending upon the application.

The host server arrangement 230 includes a variety of components including an authentication function 232, an interface function 234 and a routing function 236, each implemented using, for example, a programmed processor that is local and/or remote to the host server 230. The host server arrangement 230 also includes data storage 238, implemented using one or more local or remote memory-type arrangements. While each of the components 232-238 is shown with the host server, the physical implementation of each is selectively separate therefrom, with communication effected remotely, such as via the Internet 220.

The remote appliance 210 includes a communication interface 212 such as a display and/or audio speaker, and an input device 214 such as a keyboard, keypad or touch screen. In general, the remote appliance 210 can be implemented with any network access appliance, such as a mobile telephone, a computer, navigation system or other device capable of communicating over the Internet and of presenting information to a user at the remote appliance.

The home node 240 includes a user application router 242 and data storage 244, and communicates with the host server 230 and/or with remote appliances via the Internet 220. The user application router 242 is implemented, for example, with a computer programmed to carry out routing functions in response to routing requests. In this regard, the user application router 242 may be implemented in a manner similar to that discussed with routing components shown in FIG. 1.

Depending upon the implementation, the home node 240 includes one or more appliances, with at least one of the appliances communicatively coupled to the Internet 220. For instance, where a computer bearing the user application router 242 at the home node 240 is coupled to the Internet, information stored at the computer (with data storage 244) can be made available for communication to remote appliances. Where more than one appliance is located at the home node, at least one of the appliances communicates via the Internet and selectively accesses and/or permits communication with other appliances to facilitate data transfer requests. In this regard, the data storage 244 is selectively implemented with one or more components, such as another computer, a networked storage device, a digital video recorder or a television receiver, with at least one of the components implementing the user application router 242 and configured for communicating via the Internet.

The token-based communications arrangement 200 operates in a variety of manners, depending upon the particular application and conditions of data requests and transfers. When a user at the remote appliance 210 wishes to access data from the home node 240, the user sends an access request 211 with a token (or identification that can be used to access a token) from the remote appliance to the host server 230. The authentication function 232 uses the token to authenticate the access request. The access request 211 may, for example, include a data request such as the data request 213 discussed below, in which case the data request is selectively routed to the home node 240 from the host server 230. In other applications, the access request 211 is implemented simply to establish access, with an actual data request 213 to follow. When the home node 240 receives a routed data request (that has been authenticated or otherwise authorized) directly from the remote appliance 210 or via the host server 230, the user application router 242 facilitates access to the requested data.

In some applications, the host server 230 implements an interface function 234 to generate a web-based (e.g., packet-communicative) interface 231 that is provided to the remote appliance 210, prior to the data request 213 being generated. The host server selects data to be made available for access to the user at the remote appliance 210 using information in the token and/or provided by a registered user of the home node 240. The web-based interface 231 specifies data that is available to the user at the remote appliance 210 by displaying selections or other information that can be used to ascertain the different data or data types that are available to the user. In this regard, when a user viewing the web-based interface 231 at the remote appliance 210 makes a selection via the input device 214 from the data specified via the web-based interface, a corresponding data request is sent to the host server 230. The host server 230 implements a routing function 236 to prepare a routed data request 233 using the token, and sends the routed data request to the home node 240. Sending the routed request in this context may include, for example, communicating a command to the user application router 242 to route specific data from the home node 240. In some applications, the data request 213 is routed directly to the home node 240 as the routed data request 233, for instance where the web-based interface includes sufficient information to facilitate the routing. Data routed from the home node 240 is sent via the Internet 220 to the remote appliance 210, either directly or via the host server 230, depending upon the particular application and the type of programming and communication relationship between the host server and the user application router 242.

In certain applications involving active data (e.g., streaming data), the home node 240 passes the streaming data to the Internet 220 without necessarily storing the data in the data storage 244. For instance, where the home node 240 includes a television or radio receiver, television or radio data is selectively passed to the Internet without storing the data.

While certain functions of the home node 240 are discussed herein in connection with conventional personal-computer type approaches, the home node may be implemented with any appliance that can perform these functions and communicate using, for example, packet-based technologies. Furthermore, as the functionality of handheld and mobile devices is rapidly increasing, the home node is accordingly implemented with such appliances, where appropriate.

In addition, while shown communicatively coupled to the Internet 220, one or more of the remote appliance 210, host server-browser gateway 230 and the home node 240 may be coupled to the Internet via other communications media, such as a telephone network, television network or other network.

Figure 3:
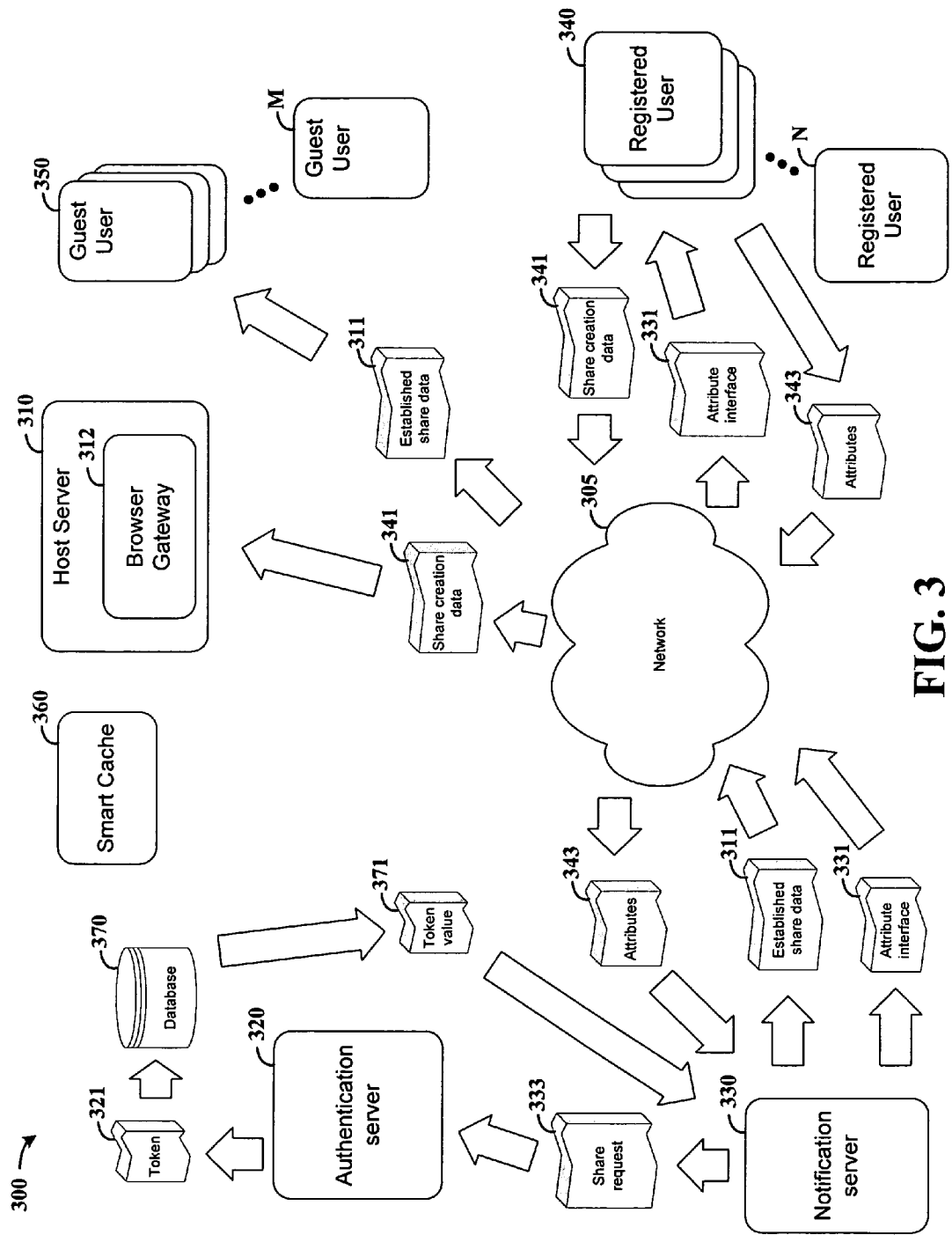
FIG. 3 is a data flow diagram showing approaches to token creation in connection with other example embodiments of the present invention.
Figure 4:
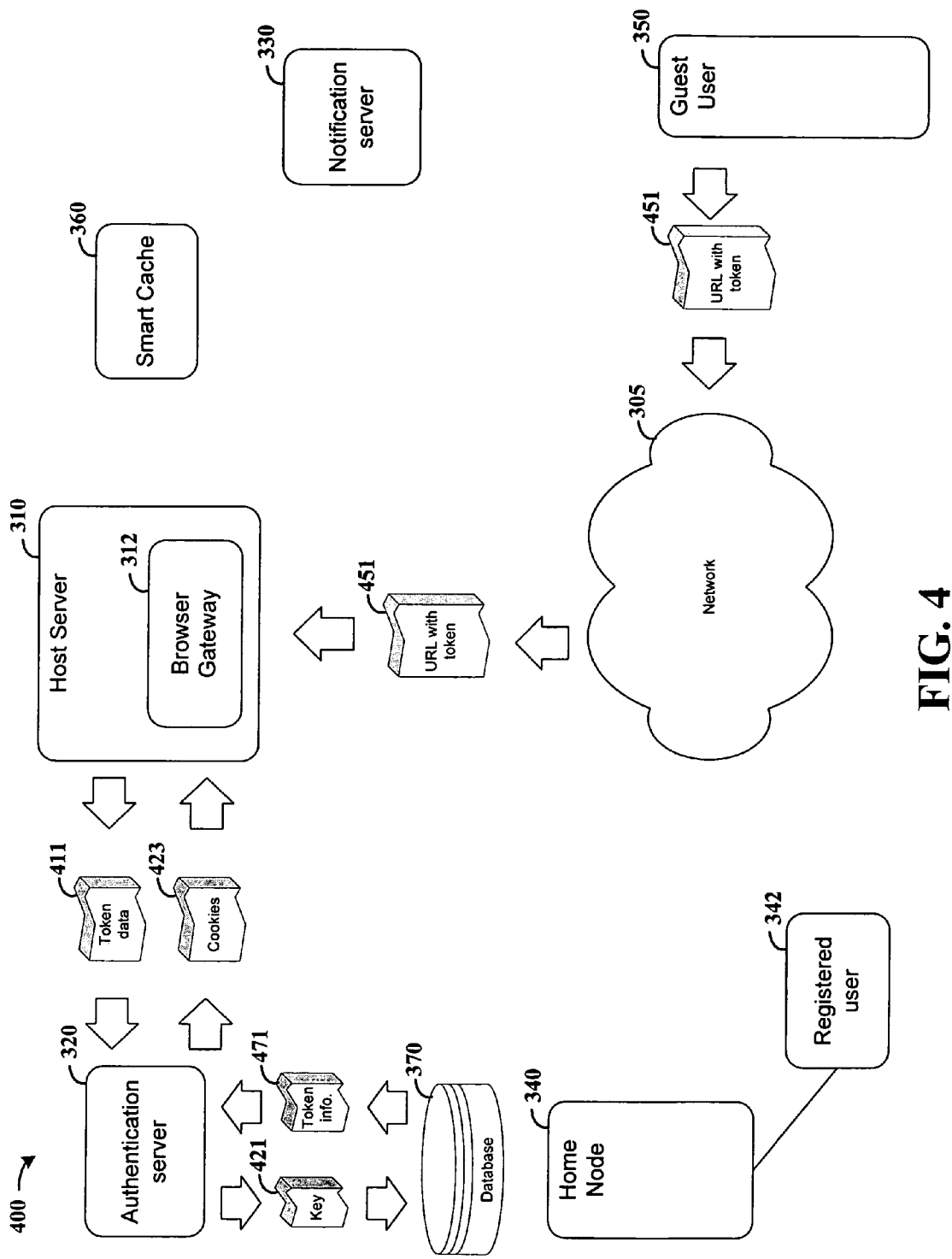
FIG. 4 is a data flow diagram showing approaches to URL-based token implementation in connection with other example embodiments of the present invention.

In the variety of approaches and implementations represented in connection with FIG. 2, the host server 230 acts as a browser gateway, facilitating Internet browser-based access to data at the home node 240 via provided tokens. That is, users at remote appliances such as remote appliance 210 gain access to data at a home node such as home node 240 at the direction of the host server, which provides an Internet (browser)-based gateway to the home node 240. FIGS. 3 and 4 and their corresponding discussion below respectively show and describe various example embodiments directed to the creation and implementation of token-based data access; these approaches can be selectively implemented with the approaches shown with and discussed in connection with FIG. 2.

FIG. 3 shows an arrangement 300 that facilitates the implementation of a variety of data-flow approaches to the establishment of a token and corresponding data access, in connection with one or more example embodiments of the present invention. The arrangement 300 includes a host server 310, an authentication server 320, a notification server 330 and a plurality of registered user-nodes 340-N, all of which communicate packet-based data via one or more networks represented by network 305. The registered user nodes 340-N are implemented in accordance with a home node or a remote network access appliance such as those described in connection with FIG. 1 and FIG. 2 above, with the registered users facilitating the generation of tokens for use in subsequent access to data at a home node.

When one of the registered users 340-N whishes to create a share to grant guest access to a resource or resources under the user's ownership, that registered user provides share creation data 341 specifying one or more guests to which the share should be made available. In addition, the share creation data 341 can specify details of data to be shared, such as by specifying rules or other information used in controlling access to data. Depending upon the application, the share creation data 341 also includes information that can be used to authenticate the data, such as information about the registered user sending the share creation data. The share creation data 341 is sent to one or both of the host server 310 (via browser gateway 312) and the guest user or users 350-M to which access is being granted. When the share creation data 341 is sent to the host server 310, it is used (as discussed further below) at the host server to facilitate the communication of established share data 311, which is sent to the appropriate registered user(s). The share data is delivered over a variety of transports, such as network mail (SMPT), instant messaging and text messaging (e.g., via a mobile telephone system), depending upon the application and the available communication medium.

In some applications, the host server 310, using the browser gateway 312, provides a user interface to the one of the registered users 340-N creating the share. Using this interface, the registered user selects either an individual resource or a collection of resources and provides the share creation data 341 to instruct the browser gateway 312 to initiate a share creation process. In this regard, the share creation data 341 may be provided by way of selections made via the interface provided with the browser gateway 312.

The host server 310 uses the share creation data 341 to generate the established share data 311. In some applications, the host server 310 generates an electronic key (e.g., data or a set of data) that uniquely identifies resources specified in the share creation data 341. This key can be as simple as a file system path to the resource or in some cases require the host server to create a logical resource collection and assign it a key. A logical resource collection is implemented, for example, when the resources contained in the collection did not fall under a single file system root (location).

The host server 310 instructs the notification server 330 to create established share data, and where appropriate, provides a content key as generated above along with a unique identifier for the host server 310, which together can be used to uniquely identify the resource specified in the share creation data 341.

In some applications, the notification server 330 presents an attribute interface 331 to the registered user, allowing the registered user to set and communicate attributes 343 of the share. For example, registered user 340 may set attributes 343 identifying the guest user's addresses, adding a text message or configuring conditions associated with the share, such as initiation or expiration dates, time of use, number of uses and more.

Once a share is configured, the notification server 330 creates a share request 333 and sends the share request to the authentication server 320. The authentication server 320 generates a token 321 including unique access data (e.g., code or ID, such as a 128 bit string). This access data is unique across the system 300. In this regard, the authentication server 320 facilitates authentication and access. In some applications, the authentication server 320 also facilitates accounting functions, such as by keeping track of the access data generated for a particular registered user and/or accessed by a guest user or users.

The token 321 (and others) generated by the authentication server 320 is sent to a system database 370 for storage. These token records associate the token value with an identifier for the host server 310, an identifier for the content and any other attributes such as the attributes 343 set by the registered user 340. Once the token 321 has been stored at the database 370, the token value 371 is returned to the notification server 330.

The host server 310 implements the notification server 330 to facilitate the communication of established share data 311 to an appropriate guest user 350. The established share data 311 includes the token, or information that can be used identify the token, for the particular guest user it is being sent to. The established share data 311 specifies data to be shared in one or more of a variety of manners. In some applications, the token value 371 is wrapped into a URL sent to the guest user 350 (e.g., via email (SMPT) or other appropriate message) to whom an owner/operator of the home node 340 wishes to grant access. The URL in the established share data 311 points to a location accessible via the browser gateway 312 hosted by the host server 310, with the token specifying access to be granted to the guest user 350.

The established share data 311 may, for example, identify specific data to be shared, may specify an identification that can be used to identify the specific data (e.g., a code that can be used to lookup share information), or may be used to identify a data location, where any data stored in that particular location is to be shared. In some applications, the established share data 311 specifies a location at a home node (e.g., a computer or other device connected to the Internet via a gateway at the home node) associated with the registered user establishing the share. In other applications, the established share data 311 specifies a network-based cache (or smart cache) 360 at which a registered user stores data for access by a guest user. In this regard, the share data 311 may effectively notify a guest user (or registered user) that a token is available for access.

In various applications, a registered user granting access may be one in the same as the guest user to whom access is granted. For instance, a registered user may wish to establish access to selected data at his or her home node, and in some applications, to a smart cache 360 established by and/or for the registered user. This approach may be applicable, for example, to a registered user working from a home node (e.g., personal computer at a home or office) who wishes to later access his or her data from a remote appliance such as a mobile telephone. In this regard, the registered user sends an email or other message (directly or via the browser gateway 312) to himself or herself including established share data 311. At a later time, the registered user can access the established share data 311 with the created token from his or her remote appliance via email or in whatever appropriate manner, and use the token to access the data specified therein. Where a smart cache 360 is used, this approach facilitates registered users' rapid access to data from remote locations, without necessarily requiring the user's home node to be available for access.

Once data access is established via the creation and delivery of share data 341, guest users implement the share data to access the specified data in one or more of a variety of manners. FIG. 4 below shows and/or discusses various approaches to implementing the share data 341 (and token therein); these approaches are applicable to the various data access implementations shown in and discussed in connection with FIG. 3 above.

FIG. 4 is a data flow diagram showing approaches to URL-based token implementation in connection with other example embodiments of the present invention. Various nodes, servers and other representations shown in FIG. 4 are labeled similarly to those shown in FIG. 3 for simplicity in description. In various applications, these similarly-labeled portions operate in a similar manner as that discussed with FIG. 3, and in other applications, in a different manner than that discussed with FIG. 3. In this regard, the approaches shown in and discussed with FIG. 4 are implemented with one or more of a variety of example embodiments. The following discussion addresses certain example applications, some of which are consistent with those described in connection with FIG. 3.

When a guest user 350 has received or otherwise possesses a token, he or she can implemented the token to facilitate access to data at the home node 340, or provided by the home node and stored, for example, in the smart cache 360. Using the example of a token provided to the guest user 350 in the form of a URL in an email message, the user simply clicks on, or otherwise selects, and sends the URL request 451 (e.g., by launching a web browser at the guest user's remote appliance). The URL request 451 points to the browser gateway 312 hosted by the host server 310 and includes information specifying the token value 371 as discussed above.

The host server 310 receives the URL request 451 via the browser gateway 312 (i.e., via an HTTP request) and validates the URL request by ensuring that the URL was generated via the host server. In some applications, the host server validates the URL request 451 by comparing two cryptographic hash values, where the first hash value is provided in the URL with the token and the second hash value is computed by the browser gateway 312; if the values match the URL is deemed valid.

Once validated, the URL request 451 is authenticated using the authentication server 320. The host server 310 facilitates this authentication by providing token data 411 to the authentication server 320, either directly including the token or including the URL request 451 (with the authentication server extracting the token from the URL request).

Once authenticated, the token data 411 is used to generate a key 421 that is used to recover token information from the database 370. The database 370 returns token information 471 from the database to the authentication server 320 for further processing.

The token information 471 from the database is used to authenticate the token data 411. For example, an expiration date in the token information 471 can be compared to a current date to ensure that the token provided in the URL 451 is still valid. In another approach, the token information 471 specifies a password, where the authentication server 320 looks for a password provided with the URL request 451 (as indicated in the token data 411).

The authentication server 320 uses the token information 471 for authenticated token data 411 to construct access control list using, for example, an identifier for the host server 310 and a content key. In some applications, the access control list further includes information specifying operations that can be performed on the resource (data being shared, such as modification and storage). Once the access control list is constructed, HTTP authentication cookies 423 are constructed and provided to the browser gateway 312.

The browser gateway 312 uses the token information and the cookies 423 to construct a complete URL that is to be used by the guest user 350 to access data. In this regard, the browser gateway 312 redirects the guest user 350 to the complete URL. The guest user 350 follows this redirect using the cookies 423. With these cookie values and the requested URL, the host server 310 authenticates and applies access control to data requests from the guest user 350.

User authentication is carried out in one or more of a variety of manners, depending upon the application and type of access granted via the authentication. For instance, in the context of FIG. 3, authentication is related to users establishing a share; in the context of FIG. 4, authentication is related to guest users attempting to gain access. In this regard, the following discussion of authentication approaches is applicable to these scenarios described in FIG. 3 and in FIG. 4, as well as others herein, while using reference numbers and referring to FIG. 3 and/or FIG. 4.

In one implementation, one of three code paths is selectively used to authenticate users, with the authentication approach implemented at one or both of a home node and a network routing node such as with a home nodes and a host servers as discussed above. An authentication code path is selected as a function of characteristics of the user implementing the token, and depends upon the conditions under which the user is attempting to gain access. For example, the user may be a registered user attempting to access one of his or her home network nodes, a guest attempting to access a resource that has been shared by the resource owner or an authenticated guest issuing multiple requests in the same session.

When a registered user is attempting to access one of his or her home network nodes, a user-supplied user name and password are used to facilitate the authentication of the registered user. Referring to FIG. 4 as an example, the user name and password are passed from a "guest user" 350 (here the registered user gaining remote access to his or her data) the browser gateway 312 to the authentication server 320 for validation. If valid, the authentication server 320 returns the appropriate access control list to the browser gateway.

If successfully authenticated, a session identifier is generated and associated with the user and the appropriate access control list. The identifier and a cryptographic hash of the session identifier, access control list, and system specific nonce are returned to the user (e.g., as an HTTP cookie). Each subsequent request for the session can be authenticated by comparing the hash value presented which the request with a hash value computed by the browser gateway, with each particular request being authenticated if the hash values match.

In some applications, the session identifier is associated with a time-related condition, such that the session expires and/or must be renewed after a certain amount of time or when a certain time is reached. Where streaming data is the subject of token-based access, such time-related condition is selectively implemented to facilitate access to programming or other content over a selected period of time. For instance, in the context of a pay-per-view television program (or other time-based content subscriptions), a guest user may be granted access for a particular time period, such as all-day access to a particular pay-per-view movie or sporting event. In this instance, a token is granted in response to a request and payment for the pay-per-view program. In some implementations, the pay-per-view program is accessed via a particular user's home node, with that user or a guest user accessing the pay-per-view program via the home node.

In another embodiment, a host server as described above is implemented at a publicly-accessible venue or business such as an airport, restaurant, coffee shop or a wireless hotspot (i.e., a location where wireless Internet access is made available). In these implementations, the host server presents a web-based interface to guest users, who select (and, where appropriate, pay for) content using the web interface. The guest user is then sent a token which is in turn used as discussed above to access content provided by the host server. This approach may be useful, for example, for guest users wishing to watch a television program or movie on their wireless device such as a telephone at a public venue such as an airport (e.g., while waiting for a flight). With this approach, guest users can access a variety of content, from prerecorded movies, live news or sports broadcasts and more, at public locations offering such token-based access.

In another example embodiment, a publicly-accessible host server approach, similar to that discussed above, is offered to mobile customers traveling in a wireless network area. For instance, where a traveler is passing along highways supported by wireless Internet access, that traveler can access content using a token in a manner similar to that discussed above, for select pay-per-view type access. The traveler accesses a host server, for example using a laptop computer or other network access device built into his or her vehicle, and the host server provides a web-based interface to the traveler characterizing the type of content available and, where appropriate, conditions of that availability such as geographical regions in which the content may be accessed. Using the web-based interface, the traveler selects content to view, pays for that content where appropriate and receives a token via email or other appropriate communication. The traveler then implements the token to initiate access to the selected content, which is streamed via the host server and the wireless Internet network.

When a guest is attempting to access a resource that has been shared by a resource owner, a token is used to authenticate the guest as discussed above. In some applications, the token is distributed with additional information that prevents tampering with the token and brute force attacks against the system. Referring again to FIG. 4, the browser gateway 312 passes the token data 410 to the authentication server 320. Successful authentication results in the generation of an access control list that is returned to the browser gateway 312, which continues processing the request by generating a session identifier and cryptographic hash as discussed in the previous paragraph. Once a guest user has established access, further access is accordingly facilitated in a similar manner to that discussed in the previous paragraph, with each subsequent request for the session accordingly authenticated via the cryptographic hash.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the functions carried out by host servers, authentication servers and home network nodes are selectively implemented together and/or in different arrangements, depending upon the application. Further, base or home nodes/appliances are selectively implemented with remote-type devices, such as mobile Internet appliances (e.g., mobile telephones, laptops or personal devices); data can be made available from such nodes/appliances to remote appliances. These approaches are implemented in connection with various example embodiments of the present invention. Such modifications and changes do not depart from the true spirit and scope of the present invention, including that set forth in the following claims.

What is claimed is:

1. A method comprising:
   causing, at least in part, receiving, by a processor, resource selections and content-sharing characteristics from a packet-communicating device associated with a registered user via a packet-based user interface, wherein the content-sharing characteristics includes data specifying a period of time during which content is available for sharing;
   in response to the resource selections, creating, by the processor, a share that designates content-sharing characteristics by generating an electronic key that specifies resources that are the subject of the received resource selections, and associating a unique identifier with the key, the unique identifier identifying an agent via which access to the specified resources can be made;
   generating, by the processor, a unique authentication for the key and assigning the generated authentication to the key;
   creating, by the processor, an electronic token bearing the key, the unique identifier and the unique authentication for use by a remote packet-communicating device as a function of the share characteristics;
   selectively initiating authentication of the token as a function of the unique authentication to
   facilitate access, by the remote user's packet-communicating device, to the requested content via the registered user's packet-communicating device as a function of the resources specified by the key in the token; and
   selectively constructing an authentication cookie to permit access to the requested content by a remote appliance.

2. The method of claim 1, wherein generating an electronic key includes generating a file system path to the specified resources and associating the key with the generated file system path.

3. The method of claim 1, wherein generating an electronic key includes specifying file locations of a collection of resources at different locations and storing information associating the key with the collection of resources.

4. The method of claim 1, wherein receiving content-sharing characteristics from the registered user includes receiving information specifying a communications approach via which to provide the token by sending the token to the remote user via the specified communications approach.

5. The method of claim 1, wherein providing the token includes at least one of: notifying the remote user that the token is available for access, notifying the registered user that the token is available, providing the token to the registered user for distribution, providing the token to the remote user, and placing the token into a URL and providing the URL to the remote user.

6. The method of claim 1, wherein providing the token includes placing the token into a URL and providing the URL to the remote user, the user implementing the token by accessing the URL, wherein authenticating the token includes extracting the token from the URL and authenticating the extracted token.

7. The method of claim 1, wherein creating an electronic token includes generating a cryptographic hash value and including the cryptographic hash value with the token, and wherein authenticating the token includes generating a new cryptographic hash value and comparing the new cryptographic hash value with the cryptographic hash value in the token and authenticating the token in response to the cryptographic hash values matching.

8. The method of claim 1, wherein generating an electronic key that specifies resources that are the subject of the received resource selections includes storing an identification of the received resource selections in association with the key.

9. The method of claim 8, wherein facilitating access to the requested content includes accessing the stored identification of the received resource selections associated with the key and providing access to requested content specified in the stored identification.

10. The method of claim 1, wherein the remote appliance is a remote Internet appliance to which the content request is made and using the authentication cookie at the remote Internet appliance to facilitate access to the content.

11. The method of claim 1, wherein facilitating access to the requested content includes generating a new URL and passing that new URL to a remote user, the new URL pointing to a web page via which the remote user can access the requested content.

12. The method of claim 1, further comprising receiving and storing access control rules form the registered user, and wherein facilitating access to the requested content includes applying the access control rules specified by the registered user.

13. The method of claim 1, further comprising, in response to receiving the token from a remote user, providing a web interface accessible by the remote user, the web interface identifying content available to the remote user.

14. The method of claim 1, wherein creating a share includes creating and storing information that designates the characterized time period, and wherein facilitating access to the requested content includes limiting access to the requested content to the period of time specified in the share characteristics.

15. The method of claim 1, wherein receiving share characteristics includes receiving a password from the registered user, and wherein authenticating the token includes authenticating the token in response to a password provided by the remote user matching the password received from the registered user.

16. An apparatus comprising:
a processing circuit configured to cause, at least in part:
receive resource selections and content-sharing characteristics from a packet-communicating device associated with a registered user via a packet-based user interface, wherein the content-sharing characteristics includes data specifying a period of time during which content is available for sharing;

in response to the resource selections, create a share that designates content-sharing characteristics by generating an electronic key that specifies resources that are the subject of the received resource selections, and associating a unique identifier with the key, the unique identifier identifying an agent via which access to the specified resources can be made;

generate a unique authentication for the key and assign the generated authentication to the key;

create an electronic token bearing the key, the unique identifier and the unique authentication for use by a remote packet-communicating device as a function of the share characteristics;

selectively initiating authentication of the token as a function of the unique authentication to facilitate access, by the remote user's packet-communicating device, to the requested content via the registered user's packet-communicating device as a function of the resources specified by the key in the token; and selectively constructing an authentication cookie to permit access to the requested content by a remote appliance.

* * * * *